Oct. 30, 1962 S. C. FITZ-GERALD 3,060,831
PRESSURE CONTROL SYSTEMS AND OUTFLOW VALVES THEREFOR
Filed March 17, 1958 2 Sheets-Sheet 1

Oct. 30, 1962   S. C. FITZ-GERALD   3,060,831
PRESSURE CONTROL SYSTEMS AND OUTFLOW VALVES THEREFOR
Filed March 17, 1958   2 Sheets-Sheet 2

United States Patent Office 3,060,831
Patented Oct. 30, 1962

3,060,831
PRESSURE CONTROL SYSTEMS AND OUTFLOW VALVES THEREFOR
Stanley Charles Fitz-Gerald, West Hendford, Yeovil, England, assignor to Normalair Limited, West Hendford, England
Filed Mar. 17, 1958, Ser. No. 721,985
Claims priority, application Great Britain Mar. 28, 1957
9 Claims. (Cl. 98—1.5)

This invention relates to systems for controlling the pressure in an enclosure and relates particularly though not exclusively to the cabin of an aircraft within predetermined limits notwithstanding changes of external atmospheric pressure and to an improved form of outflow valves for use with such systems.

The term aircraft cabin is meant to refer to any enclosure that is caused to pass through the earth's atmosphere.

With aircraft cabin pressurization systems danger or at least inconvenience to the occupants of the cabin may be incurred in the event of the outflow valve failing to close thus allowing the pressure in the cabin to fall towards that of the external atmospheric pressure. Moreover, systems wherein one outflow valve only is used failure of such a valve to close may result in total loss of cabin pressure as the outflow from said valve may exceed the inflow of air to the cabin.

In known cabin pressure control systems it is usual to have an outflow valve controlled by a pressure supplied from a pressure controller. This controller transmits a pressure to a control chamber within the outflow valve, this control chamber generally comprising the internal walls of the valve housing and closed by a diaphragm which is attached directly or indirectly to the actual valve member.

Thus in response to changes in pressure sensed within the control chamber of the outflow valve and in turn a varying pressure differential being set up across the diaphragm so the valve will tend to open or close. Should for some reason the valve become damaged controlling pressure could escape to atmosphere and the pressure within the cabin would then begin to fall and at the same time the pressure controller becomes ineffective.

One of the main objects of the present invention is to provide a system whereby loss of cabin pressure, in the event of an outflow valve failing to close, through some defect, is prevented or minimised.

Another object of the present invention is to provide a system whereby an undue rise in cabin pressure is prevented or minimised should an outflow valve fail to open through some defect.

The invention consists in a pressure control system comprising a pressure controller of known type in conduit communication with a plurality of outflow valves of the type to be described wherein the flow capacity of each outflow valve being so proportioned as to enable the effect of failure of one or more valves dependent upon the number of valves provided, to be tolerated without loss of pressure control the outflow valves being controlled by a common signal pressure generated by a pressure controller.

The invention also consists in a pressure control system comprising a pressure controller in conduit communication with a plurality of outflow valves of the type to be described.

In carrying the invention into effect according to one convenient form by way of example only with reference to the accompanying drawings, wherein.

Figure 1:
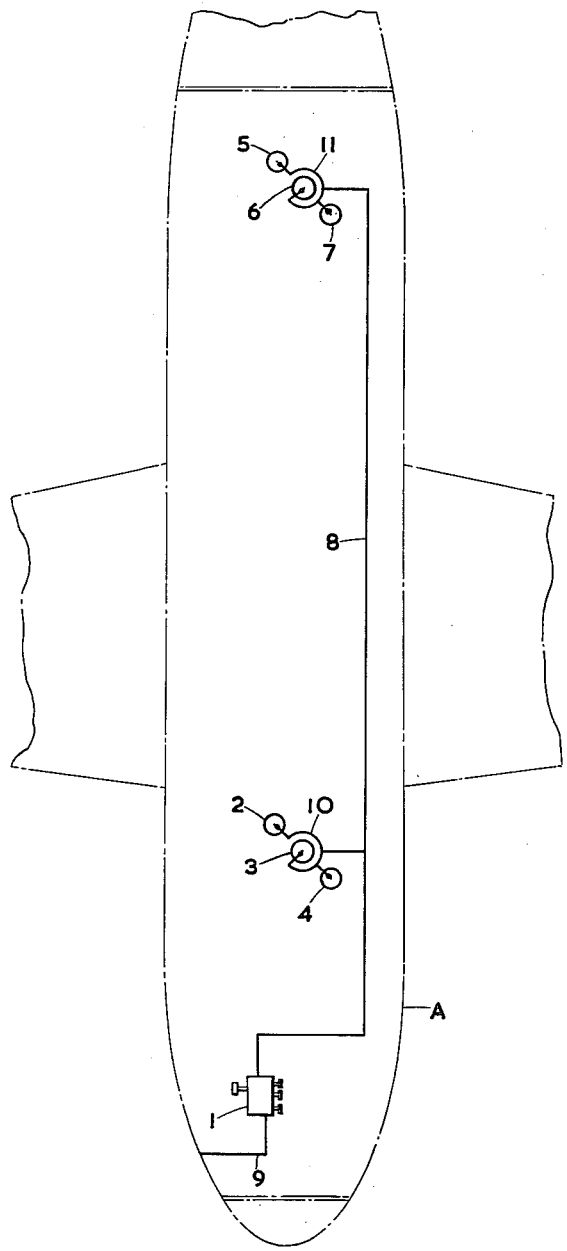
FIGURE 1 shows diagrammatically pressurisation system as installed in an aircraft.

Referring to FIGURE 1 the outline of an aircraft pressure cabin hereafter referred to as the enclosure is generally represented at A and is provided with a pressure controller 1 of any suitable type, such as for example, the regulator shown in the U.S. patent to Bernard N. Maas, No. 2,767,637, used for controlling the pressure within an enclosure such as an aircraft cabin. Six outflow valves 2, 3, 4 and 5, 6, 7, are disposed in two groups, all being in communication with a common pressure source by way of pressure pipe line 8 from pressure controller 1 and local continuation pipes 10 and 11.

The flow capacity of each outflow valve is proportioned so as to enable the effect of failure of a valve to be tolerated without loss of signal pressure derived from the pressure controller. Each individual valve takes the form of an outflow valve which is provided with a pressure relay unit incorporated in each such valve so as to isolate the outflow valve from pressure controller signal pressure in the case of the outflow valve failing to normally operate.

The pressure control system incorporating one pressure controller communicating with outflow valves operates in the normal manner of such systems inasmuch as to maintain predetermined conditions within the aircraft cabins. Any tendency for the enclosure pressure to fall consequent on a valve failing to close, due to some defect, will immediately result in the remaining effective valves tending to close and reduce flow therethrough until excessive flow through the defective valve is compensated and flow through said defective valve will not then exceed the main input to the enclosure. Enclosure pressure will from then on be maintained by the remaining effective valves despite the loss of air through the defective valve. Similarly should any valve fail to open, through some defect, any tendency for enclosure pressure to rise will immediately result in the remaining effective valves tending to open further and increase flow therethrough until the reduced flow through said defective valve is compensated and, in addition each valve is provided with a safety relief valve to prevent any further rise in pressure above maximum permissible pressure.

The failure of any of the outflow valves to open or close will not affect the normal operation of the remaining effective valves as each outflow valve is indirectly controlled through a relay unit which receives a signal by way of a change in pressure from the pressure controller. This relay unit in turn regulates the control pressure within the outflow valve itself in a manner to be described and isolates the valve from direct communication with the pressure controller.

Figure 2:
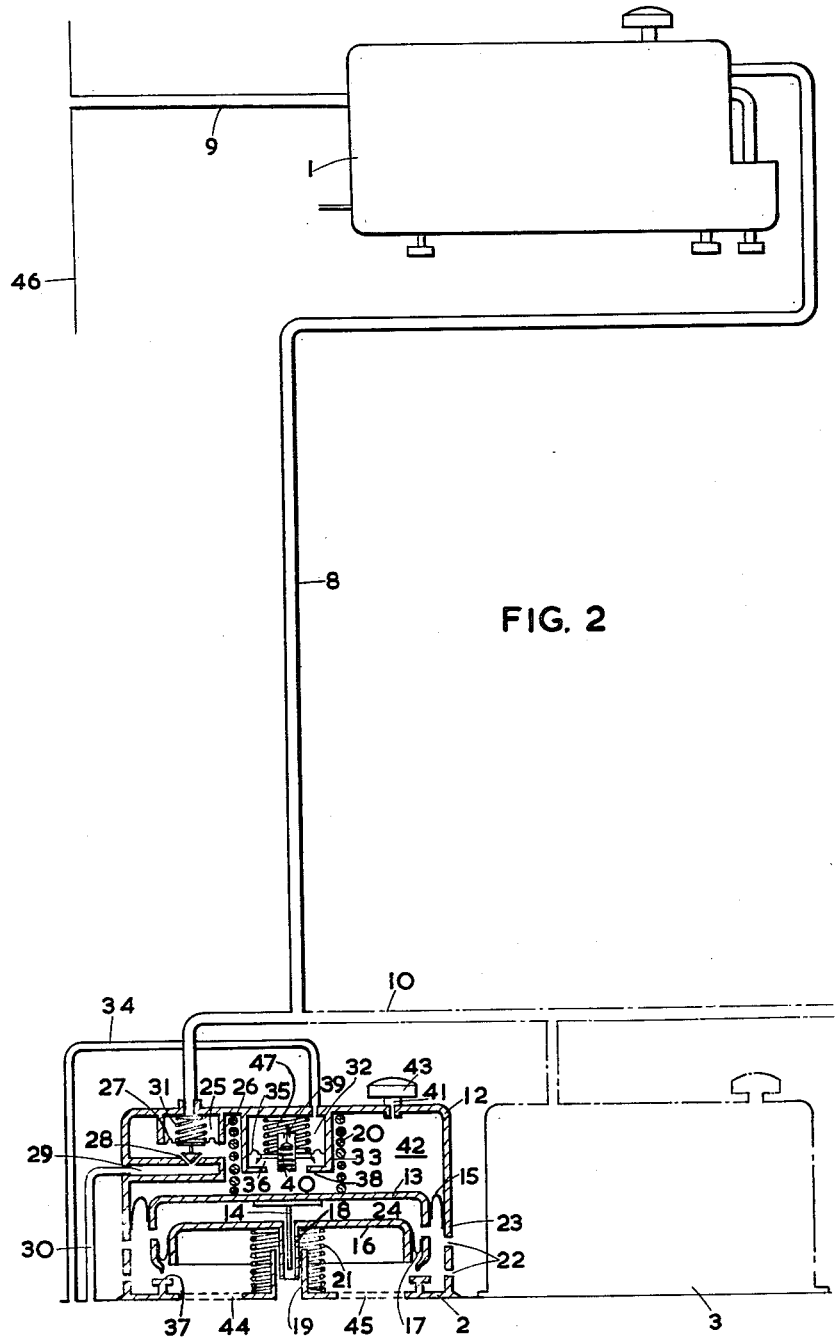
FIGURE 2 shows diagrammatically in detail the outflow valves shown in FIGURE 1.

With reference to FIGURE 2 the outflow valve which forms part of this invention is shown in detail and is connected to a pressure controller 1. Two valves generally indicated at 2 and 3 are shown in section and chain dotted outline respectively. The pressure controller 1 of any suitable form is provided having a pipe 9 communicating with the exterior of the aircraft 46 and the pressure controller 1, a pipe 8 communicating the signal pressure from the pressure controller 1 to the valves 2 and 3 by way of connecting pipe 10. Valve unit 2 comprises a casing 12 and disposed in spaced relation within said casing 12 is located an inverted cup shaped outflow valve member 13 mounted on a slidable spindle 14 and operating on valve seating 37. A flexible sealing element 15 is disposed between said valve member 13 and casing 12; in spaced concentric relationship with valve member 13 is located an inverted cup shaped baffle member 16 having a flexible sealing element 17 disposed between the baffle member 16 and valve member 13, the whole movable on a valve guide 19. Valve member 13 is urged to a closed position by compression spring 20 and baffle member 16 is urged to an open position by compression spring 21. Casing 12 is provided with a series of circumferential ports 22 and valve member 13 is provided with ports 23 thus allowing communication between space 24 and enclosure pressure, via ports 22. Within casing 12 is located a relay valve generally indicated at 25 comprising a casing 26 open at one end to communicating pipe 10 and closed at the other end by diaphragm 27 the diaphragm supporting an extension forming a valve 28 operating in a duct 29 in communication with ambient air by way of pipe 30 communicating with the exterior of the aircraft. Valve 28 is urged into closed position by spring 31, and also located in casing 12 is a safety valve generally indicated at 32, which comprises a compartment sealed at one end by a flexible diaphragm 35 the other end being in communication with ambient atmospheric pressure via pipe 34. The lower side of diaphragm 35 is subjected to pressure in compartment 42, the difference between atmospheric pressure on one side of diaphragm 35 and a predetermined maximum enclosure pressure on the other side is balanced by a spring 45. Should enclosure pressure, and therefore pressure in compartment 42, rise above the maximum determined pressure, the excess of pressure on diaphragm 35 will overcome spring 47 and cause diaphragm 35 together with seating plate 36 and auxiliary valve 39 to rise until the stem of said valve makes contact with the roof of casing 12. Thereafter, a further rise will cause valve 39 to open and permit pressure in compartment 42 to escape to atmosphere via pipe 34. As the area of valve 39 is greater than the area of the restricted inlet 41, which has a filter 43 provided from enclosure to compartment 42, pressure in compartment 42 will fall below that of the enclosure. As enclosure pressure is maintained in compartment 24, the outflow valve 13 will rise and open to permit cabin air to escape to atmosphere until enclosure pressure is restored to the normal predetermined degree when the differential across diaphragm 35 will again be balanced by spring 47, and valve 39 will close.

As already stated, in aircraft cabin pressure control systems of the known type, failure of the outflow valve to operate due to leakage occurring between the control chamber of these known outflow valves and atmosphere will cause the valve itself to become inoperative as control pressure supplied from a pressure controller will escape to atmosphere and have no effect upon the valve. However, by incorporation of the outflow valve as described and as illustrated in this specification, the possibility of leakage between control chamber within the outflow valve and atmosphere is almost eliminated as will now become apparent from the following description. Relay valve 25 already briefly referred to is the only part of the outflow valve unit 2 which is in direct communication with a source of signal pressure derived from pressure controller 1. Thus in the event of the outflow valve member 13 failing to close or open through some defect, signal pressure from pressure controller 1 is still confined within relay valve 25 and thus enables the pressure controller to continue to operate effectively any additional outflow valves that may be provided.

The relay valve 25 operates in the following manner, valve 28 closes a port in duct 29 which is in communication with ambient atmospheric pressure via pipe 30, valve 28 attached to diaphragm 27 is retained normally in the closed position by spring 31 acting between wall of chamber 12 or diaphragm 27. The upper surface of diaphragm 27 is subjected to signal pressure from the pressure controller 1, via pipe 8, and the lower side of diaphragm 27 is subjected to control pressure in compartment 42. Should enclosure pressure, and therefore pressure in compartment 42, tend to rise above a predetermined figure the pressure controller 1 will cause a reduction of pressure on diaphragm 27, by way of pipe 8, the differential thus caused across diaphragm 27 will cause said diaphragm to overcome the force exerted by spring 31 and open valve 28 allowing pressure in compartment 42 to escape to atmosphere, via duct 29 and pipe 30. The resultant fall of control pressure in compartment 42 will cause outflow valve member 13 to open and allow cabin air to escape to atmosphere until enclosure pressure is reduced to the normal predetermined figure. Thus the control of the outflow valve unit by the pressure controller operates in the normal manner of such systems with the exception that a relay valve is interposed, with the result that the pressure controller operates through the medium of the relay valve which in turn controls the pressure in compartment 42 and so controls the outflow valve member 13.

Referring now to baffle member 16, at ground level it is biased into the fully open position by spring 21 in which position no obstruction is offered to full flow through outflow valve 13 when fully open. As the aircraft altitude increases, baffle member 16 is subjected to a pressure difference between enclosure and atmosphere, across its face, the compartment 24 being open to enclosure pressure via ports 23 and the lower face being subjected to atmospheric air via outlet ports 44 and 45. As the aircraft continues to ascend and enclosure pressurisation commences the increasing pressure differential will, by overcoming spring 21, progressively close the baffle member 16 whereby the effective area of the outflow valve 13 is progressively reduced without in any way effecting the normal operation of the outflow valve 13. As the port area of the outflow valve requisite for ground level conditions are unnecessarily large, thus for conditions at high altitudes no throttling condition will result from reducing this area at altitude. The baffle member 16 moves to a maximum restriction at a differential pressure below that normally existing at cruising altitude conditions, the loss of enclosure pressure does not therefore cause the port area to increase immediately the enclosure to atmosphere pressure differential decreases. The normal setting is for maximum restriction at 4.4 pounds per square inch pressure differential for aircraft enclosure pressures operating at 6.5 pounds per square inch differential or more. Loss of enclosure pressure reducing the differential will not affect restriction until a differential pressure of 4.4 pounds per square inch is reached. If, therefore, at high altitudes one or more of the outflow valves should inadvertently remain open, through some defect, consequent excessive air flow through this valve, and therefore possible rapid fall in cabin pressure, will be considerably less than would be the case if the full port area were available. Moreover, when a number of outflow valves are provided, any tendency for the enclosure pressure to fall, consequent on one or more valves failing to close, due to some defect will immediately result in the remaining effective outflow valves tending to close and reduce flow therethrough until excessive flow through the defective valve or valves is compensated, and flow through said defective valve or valves will not then exceed the main input of air to the enclosure. Enclosure pressure will from then on be maintained by the remaining effective valves despite the loss of air through the said defective valve or valves.

Thus from the foregoing an outflow valve is provided for use in enclosure such as aircraft cabin pressurisation systems wherein means are provided that will enable the outflow valve to deal with the following emergencies without any of the harmful and uncomfortable effects of increase or decrease of enclosure pressure being experienced by the occupants of the aircraft.

In the event of the outflow valve member 13 failing to close at altitudes where the aircraft is being pressurised, and subsequent loss of enclosure pressure is to be expected, baffle member 16 will be in the position of maximum restriction to the flow of air through the valve, and therefore rapid fall in cabin pressure will be considerably less than would be the case if the full outflow port area were available.

In the event the valve 13 or diaphragm 15 becoming punctured, torn or damaged in any way as to allow pressure within chamber 42 to escape to atmosphere via outflow valve ports 44 and 45 control pressure will be practically unaffected as no loss of control pressure through the outflow valve can be experienced.

I claim:

1. A discharge valve for a pressurized enclosure comprising means defining a casing having an inlet port and an outlet port, flexible means dividing the casing into a control chamber and a discharge chamber, said discharge chamber communicating with the inlet port and operatively communicating with the outlet port, means associated with the control chamber for regulating the pressure therein, said flexible means including an inverted cup-shaped valve member disposed to control the opening of the outlet port in response to pressure variation in the control chamber, a movable inverted cup-shaped baffle member flexibly mounted to the interior of the cup-shaped valve member and defining a space with the base portion thereof, and additional port means connecting the said space with the discharge chamber, the said inverted cup-shaped baffle member being biased away from said outlet port and having its lower face subjected to pressure at the outlet port, the baffle member being operable to restrict the opening of the outlet port upon failure of the cup-shaped valve member.

2. A discharge valve according to claim 1 wherein the inverted cup-shaped baffle member is disposed substantially coaxial with the cup-shaped valve member.

3. A discharge valve according to claim 1 wherein the inverted cup-shaped baffle member is disposed opposite the outlet port and biased inward of the casing from the outlet port.

4. A discharge valve according to claim 1 wherein the inverted cup-shaped baffle member is mounted on a diaphragm secured within the cup-shaped valve member.

5. A discharge valve according to claim 1 wherein the cup-shaped valve member is disposed substantially coaxial with the outlet port.

6. A discharge valve according to claim 1 wherein the cup-shaped valve member is disposed opposite the outlet port and biased to close the outlet port.

7. A discharge valve according to claim 1 wherein the flexible means further comprises a diaphragm on which the cup-shaped valve member is mounted.

8. A discharge valve according to claim 1 wherein said means for regulating the pressure in the control chamber includes exhaust valve means responsive to pressure control means associated with the discharge valve, and means defining a restricted inlet for the control chamber.

9. A discharge valve according to claim 8 wherein said means for regulating the pressure in the control chamber further comprises pressure relief valve means responsive to a predetermined pressure in the control chamber.

References Cited in the file of this patent

UNITED STATES PATENTS

| 2,393,343 | Schroeder | Jan. 22, 1946 |
| 2,754,745 | Arthur | July 17, 1956 |
| 2,814,241 | Silver | Nov. 26, 1957 |